United States Patent [19]

Thaller

[11] Patent Number: 4,973,185
[45] Date of Patent: Nov. 27, 1990

[54] TURNBUCKLE

[76] Inventor: Heinrich Thaller, No. 51/12/4 Rudolf Zeller Gasse, A-1230 Vienna, Austria

[21] Appl. No.: 400,616

[22] Filed: Aug. 30, 1989

[30] Foreign Application Priority Data

Sep. 5, 1988 [AT] Austria .................................. 2174/88

[51] Int. Cl.⁵ .......................... B25G 3/00; F16B 7/06
[52] U.S. Cl. ......................................... 403/11; 403/43
[58] Field of Search ..................... 403/43, 44, 45, 46, 403/47, 48, 11

[56] References Cited

U.S. PATENT DOCUMENTS 1,573,397 2/1926 Grenier .............................. 254/235
2,822,199 2/1958 Johnson ............................... 403/45

FOREIGN PATENT DOCUMENTS 110945 6/1984 Japan ..................................... 403/43
944238 12/1963 United Kingdom .
2106607 4/1983 United Kingdom .

Primary Examiner—Andrew V. Kundrat
Attorney, Agent, or Firm—Seidel, Gonda, Lavorgna & Monaco, P.C.

[57] ABSTRACT

The invention relates to a turnbuckle having two adjusting rods, miter gear elements, bearing elements for the gear elements and a casing surrounding the rods and elements, the casing having a longitudinal axis, the gear elements and rods situated on the longitudinal axis; thread means; the adjusting rods and gear elements connected by the thread means; an external casing formed of one piece and provided with holding means for fixing the gear elements, bearing elements and adjusting rods, and a lateral access aperture in the casing.

9 Claims, 2 Drawing Sheets

TURNBUCKLE

BACKGROUND OF THE INVENTION

The present invention relates to a turnbuckle comprising two adjusting rods or setting bars, an angular or miter gear consisting of gear elements, bearing elements for said gear elements and a casing surrounding these rods and said elements, said casing having a longitudinal or longer axis, the gear elements of said gear and said rods being situated along said longitudinal axis, thread means, said adjusting rods and said axial gear elements being connected by said thread means.

In an earlier turnbuckle of this kind with a bevel gear miter wheel gearing, the casing for transmission of the forces between the adjusting rods is divided either in longitudinal or in transverse direction and the resulting casing elements are joined together by a number of screws, rivets or the like.

In another kind of turnbuckle containing a miter gear, the forces between the adjusting rods are transmitted by an actuating rod extending coaxially through a one-piece or integrally formed casing and connecting the adjusting rods to one another U.S. Pat. No. Ser. 2,822,199(US-PS). Thereby the casing surrounding the adjusting rods merely forms a shell or cover surrounding the gear parts, whereas the tension or pressure forces of the adjusting or setting rods are taken up by the actuating rod which is connected to the adjusting rods by means of threads which can result in weak points in the toothed or grooved area of the actuating rod.

It is the object of the invention to improve turnbuckles containing miter gears in such a manner that they resist or withstand very great forces or strains and that can be very easily produced and maintained.

According to the present invention, this object is achieved by providing a casing consisting of one piece and provided with holding means for fixing the gear elements, the bearing elements and the adjusting rods. The casing encloses the gear elements and the bearing elements and is adapted to transfer the forces between the adjusting rods. The casing is also provided with at least one opening adapted for inserting the gear elements into the casing.

Because of the fact that the one-piece casing of the turnbuckle is dimensioned so that it can take up the forces between the adjusting rods and that the gear elements can be easily mounted, the casing maybe formed in a particularly simple manner e.g. from a single aluminum or steel block by boring out or milling out or reaming. Thus the whole turnbuckle can resist particularly high forces, strains or loads. Also, the gear elements are very well protected against external mechanical strains by the particularly sturdy construction of the casing. This construction further results in very low maintenance costs or in a maintenance-free operation by the selection of appropriate materials.

The fundamental or basic idea of the turnbuckle of the present invention is that it is practically designed and produced like a conventional turnbuckle, i.e. that the tension and pressure forces between the adjusting or setting rods are transmitted or guided cover the outer casing or sleeve and that at the same time, it is actable via a miter gear by a laterally applicable wrench, particularly a(n) (electrical) torque wrench, without twisting the ropes, chains, bars or the like to be connected.

One embodiment of the present invention includes a lateral gear wheel that is well supported, on the one hand, and easily accessible, on the other hand, and can be particularly easily inserted into the casing. The embodiment is characterized in that the insertion opening for at least one of the gear elements is opposed to the shoulder bearing of the lateral gear and is optionally closed by a plug-in cap or a threaded cap.

The mounting or assembling of the miter gear in the one-piece casing is further facilitated by the fact that the gear elements extending in the longitudinal direction of the one-piece casing of the turnbuckle are secured by recessed bearing sleeves screwed into the casing, while the axial bearing sleeves for securing the adjusting rods and the axial gear elements contain feather keys or securing screws to protect them against distortion.

The external ends of the adjusting rods ran thus form a cardan joint or a universal joint together with the supporting eyes to assure an extremely favorable adaptability of the mechanism of the adjusting rods or setting bars and the supporting eyes.

According to a further preferred feature of the invention, the production of the turnbuckle can be greatly facilitated by forming the openings provided in the one-piece casing as a single longitudinal bore and a single transversal bore. The bores in the casing can be recessed for the forming of bearing shoulders.

BRIEF DESCRIPTION OF THE DRAWINGS

The invention is explained in detail in the following by means of an exemplary embodiment with reference tn the accompanying drawings wherein.

DETAILED DESCRIPTION OF THE INVENTION

Figure 1:
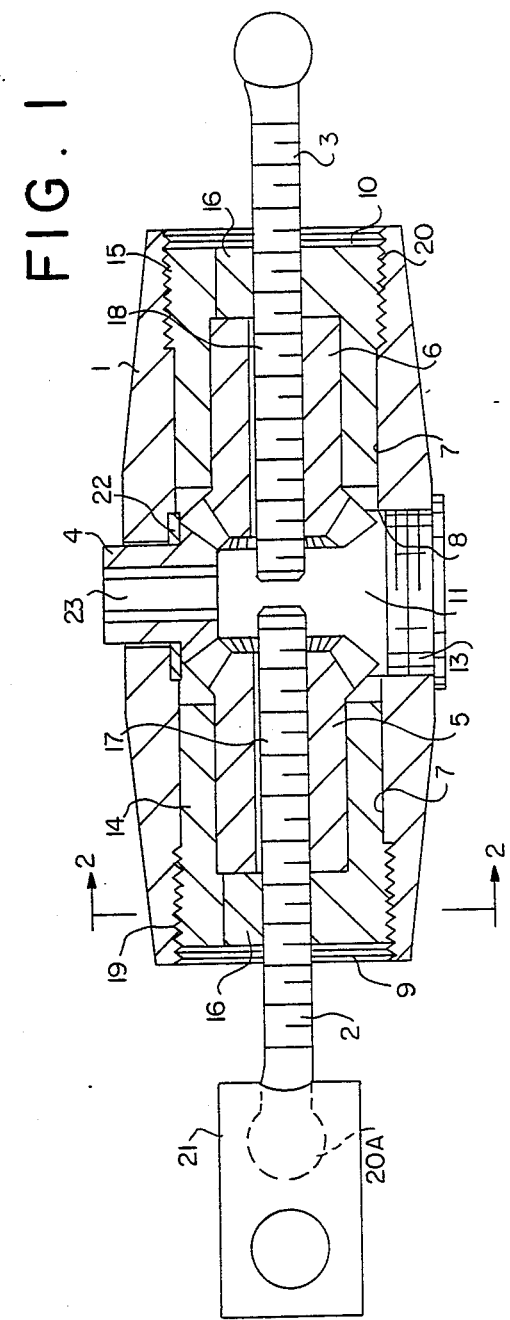
FIG. 1 shows a longitudinal section through a preferred embodiment of the turnbuckle constructed according to the present invention.

In the figures, the turnbuckle is represented by two adjusting rods, a miter gear and a casing surrounding or enclosing these parts. The essential difference in relation to the earlier turnbuckle mentioned in the preamble to the specification consists in that the casing enclosing or surrounding the miter gear is made in one piece and is dimensioned in such a manner that it can withstand the or all the forces between the adjusting rods and take up these forces. Further the turnbuckle according to the invention can be produced more economically and is more resistant against external influences. The bevel gear can be inserted through the lateral opening, through the axial or longitudinal openings or through all three openings, if the bores or openings are dimensioned accordingly.

According to the invention, the casing 1 is formed in one piece for the transmission of the forces between the adjusting rods, setting bars or draw rods 2,3 and the miter wheel gearing formed by the bevel gear elements 4,5,6 is inserted through at least one of the bores 7,8 or openings 9,10, 11 of the casing. One of the insertion openings of the bevel gears is opposed to the shoulder bearing 12 of the lateral drive bevel gear 4 and is optionally closed by a plug-in cap or threaded cap 13. The bevel gear elements 5,6 arranged in the longitudinal direction of the one-piece turnbuckle casing are secured in the casing by means of, optionally bipartite, bearing sleeves 14,15 anchored in the casing 1 by thread means 19,20. The axial bearing sleeves 14, 15 for securing and anchoring the adjusting rods 2,3 and the axial bevel gear elements 5,6 contain, particularly for securing them against mutual distortion, feather keys 16 or securing screws (not shown) engaging flattenings 28 provided on the adjusting rods 2,3. The adjusting rods 2,3 and the axial bevel gear elements 5,6 are connected by the thread means 17 and 18, so that the function of the device according to the invention can be performed in the manner of a conventional turnbuckle. In this embodiment, the external ends of the adjusting rods form together with the supporting eyes 21 form a cardan joint or universal joint 20A. The openings 10, 11 provided in the one-piece casing 1 are constituted by one single longitudinal bore 7 and one transversal bore 8, while the axes of these bores preferably intersect, whereby highly favorable savings in material, in particular regarding the one-piece casing 1, can be achieved.

The external elongated casing 1 preferably consists of a light metal or alloy (Peradur). The adjusting rods 2, 3 and the bevel gear elements 4,5,6 are preferably made of steel and the securing bearing sleeves 14,15 connected to the casing are preferably made of brass or copper. To facilitate the insertion of the axial bevel gear elements 5,6, the gear rims and the associated driving elements or driving sleeves for the adjusting rods can be releasably connected or mutually engaged e.g. by means of a claw coupling or a plug coupling. It is understood by those skilled in the art that the lateral gear wheel can have a superimposed ring gear or can be formed by a spur bevel gear, while the axial bevel gear elements can consist of spur gear elements. A bearing disk or bearing washer 22 made of tempered or hardened steel can be provided between the lateral bevel gear 4 and the casing 1. The reference numeral 23 indicates an opening for inserting a box spanner or the like for the actuation of the turnbuckle.

Figure 2:
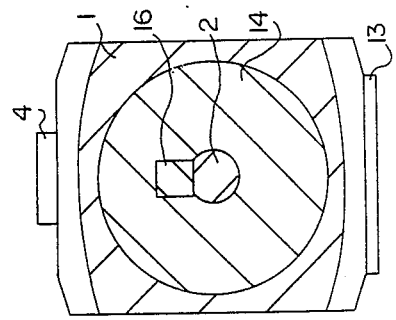
FIG. 2 shows a cross section through the arrangement of setting bars (adjusting rods) and securing thereof in a turnbuckle according to FIG. 1.
Figure 3:
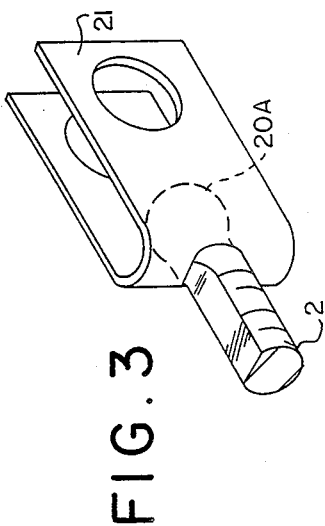
FIG. 3 represents a detail of the supporting eyes and shackle arrangement indicated at the left-hand side of FIG. 1.
Figure 4:
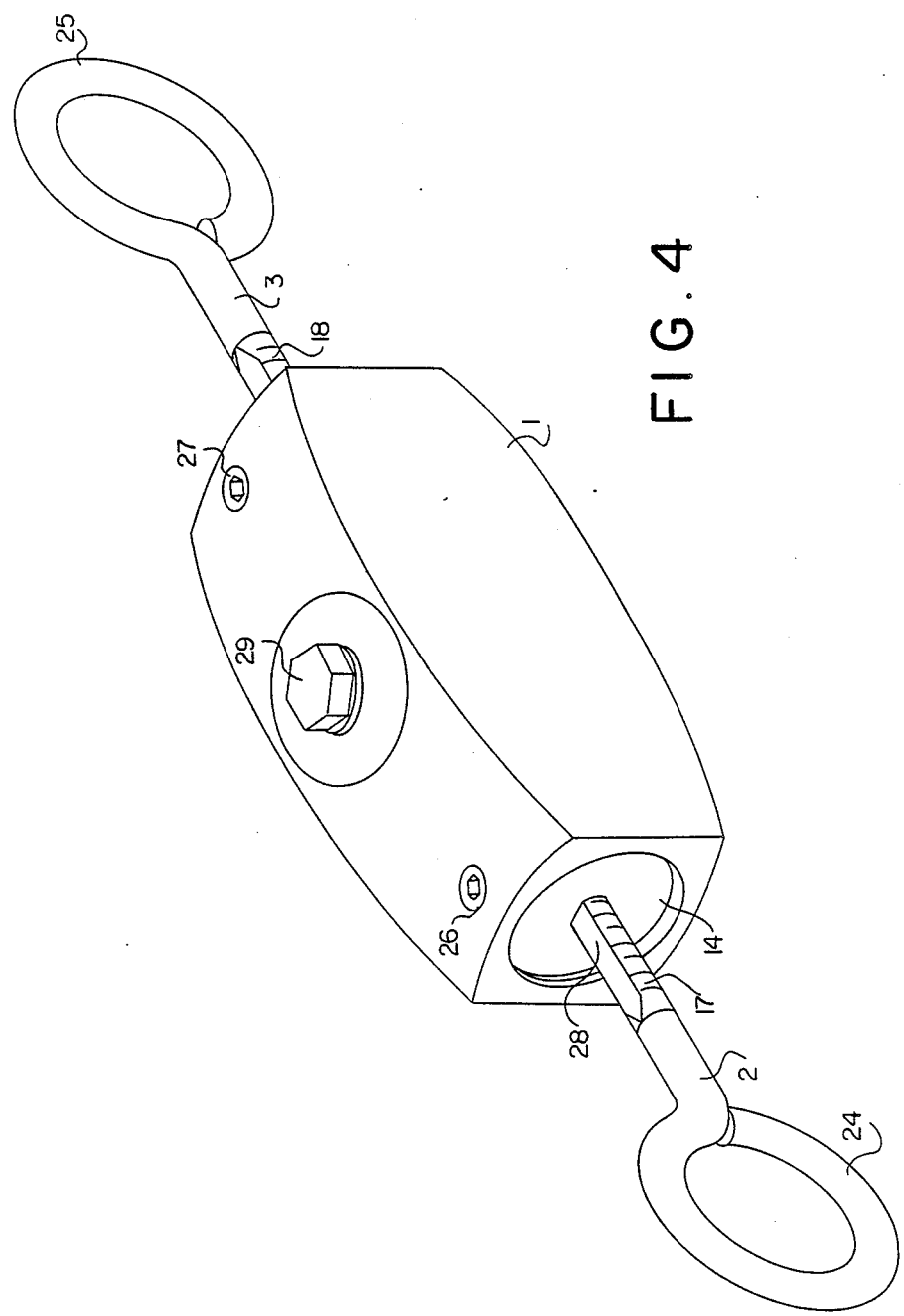
FIG. 4 is a perspective view of a turnbuckle according to the invention with a mechanical structure as shown in FIG. 1 and 2.

The embodiment shown in FIG. 4 in perspective view technically corresponds to the turnbuckle illustrated in FIG. 1 and 2, it therefore has a miter gear consisting of three bevel gear elements. Like parts are indicated with like reference numerals. In this illustration, the casing is indicated with 1, the adjusting rods are indicated with 2 and 3, the thread means of the adjusting rods 2,3 with 17,18 and the supporting eyes bent out from the adjusting rods 2,3 with 24 and 25. Bores 26 and 27 serve for the insertion of securing screws which replace the feather keys 16 in engaging the flattenings 28 to assure that the adjusting rods 2, 3 cannot be rotated in relation to the casing 1. The lateral drive of the turnbuckle takes place analogously to the turnbuckle according to FIG. 1, while the bevel gear and drive gear 4 is made solidly and is connected to a hexagonal actuating head 29 protruding from the casing 1 for engagement with a wrench (not shown).

I claim:

1. A turn buckle comprising: two adjusting rods, gear elements, bearing elements for said gear elements and a one piece casing surrounding the rods and said gear elements, said casing having a longitudinal axis, said gear elements and said rods being situated along said longitudinal axis, said adjusting rods and said gear elements being connected by a threaded engagement, said casing including holding means for fixing said gear elements, said bearing elements and said adjusting rods within said casing, said casing enclosing said gear elements and said bearing elements and being adapted to transfer the forces between the adjusting rods and provided with at least one opening adapted for inserting said gear elements into said casing.

2. the turn buckle according to claim 1, wherein said gear elements include axial gear elements, a lateral gear element, a shoulder bearing for the lateral gear element, and the casing having an insertion opening for positioning at least one of the gear elements in opposition to said shoulder bearing of the lateral gear element.

3. The turn buckle according to claim 2, further comprising a cap for closing said insertion opening.

4. The turn buckle according to claim 1, comprising at least one bearing sleeve, said sleeve being provided with a recess, said sleeve being situated along the longitudinal axis of the casing, said axial ;gear elements being secured by said sleeves the sleeve having a shell, said casing having an inner surface, said shell and said inner surface being provided with a thread, said sleeve being retained by means of said threads in said casing.

5. The turn buckle according to claim 4, wherein the sleeve secures the adjusting rods and the axial gear elements.

6. The turnbuckle according to claim 1, wherein said casing has two front ends, two of said openings being situated at these front ends, these openings having axes coinciding with said longitudinal axis of the casing, said casing being provided with a further lateral opening at the outer shell of said casing, and approximately in the longitudinal center of said casing.

7. A method for producing the turnbuckle according to claim 6, characterized by forming the front openings in the one-piece casing by a single bore in the longitudinal axis of said casing and by forming the lateral opening by a bore transverse to the longitudinal axis of said casing.

8. A turnbuckle comprising two adjusting rods or setting bars, an angular or miter gear consisting of three bevel gear elements, bearing elements for said gear elements and a casing surrounding these rods and said elements, and said casing having a longitudinal or longer axis, two gear elements of said gear and said rods being situated in said longitudinal axis, thread means, said adjusting rods and said gear elements being connected by said thread means, wherein said casing consists of one piece and is provided with holding means for fixing said bevel gear elements , said bearing elements and said adjusting rods, said casing enclosing said gear elements and said bearing elements and being adapted to transfer the forces between the adjusting rods and being provided with at least one opening adapted for inserting said gear elements into said casing.

9. The turnbuckle according to claim 8, wherein the third gear element is situated laterally to the longitudinal axis of the casing, said third gear element having an axis, said axis extending normally to the longitudinal axis of said casing.

* * * * *